United States Patent
Yun et al.

(10) Patent No.: US 7,236,801 B2
(45) Date of Patent: Jun. 26, 2007

(54) METHOD AND APPARATUS FOR ADJUSTING POWER IN A COMMUNICATION SYSTEM FOR A CHANNEL USED FOR POWER CONTROL FOR REVERSE FEEDBACK CHANNELS

(75) Inventors: Young Woo Yun, Seoul (KR); Young Jo Lee, Kunpo-shi (KR); Ki Jun Kim, Seoul (KR); Soon Yil Kwon, Kunpo-shi (KR); Suk Hyon Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 619 days.

(21) Appl. No.: 10/283,107

(22) Filed: Oct. 30, 2002

(65) Prior Publication Data

US 2003/0083093 A1     May 1, 2003

(30) Foreign Application Priority Data

Oct. 31, 2001    (KR)   .......................... 10-2001-67486

(51) Int. Cl.
*H04Q 7/20* (2006.01)
*H04B 7/00* (2006.01)
*H04B 1/04* (2006.01)

(52) U.S. Cl. ...................... 455/522; 455/69; 455/127.1

(58) Field of Classification Search ................ 455/522, 455/69, 127.1, 67.11, 434, 436
See application file for complete search history.

(56) References Cited

U.S. PATENT DOCUMENTS

| | | | | |
|---|---|---|---|---|
| 6,304,562 B1 * | 10/2001 | Kim et al. | ................... | 370/332 |
| 6,434,367 B1 * | 8/2002 | Kumar et al. | .................. | 455/70 |
| 6,498,785 B1 * | 12/2002 | Derryberry et al. | .......... | 370/311 |
| 6,519,473 B1 * | 2/2003 | Park et al. | .................... | 455/522 |
| 6,542,756 B1 * | 4/2003 | Kim | ........................... | 455/522 |
| 6,587,696 B1 * | 7/2003 | Ma et al. | ..................... | 455/522 |
| 6,615,053 B1 * | 9/2003 | Lee et al. | .................... | 455/522 |
| 2003/0050084 A1 * | 3/2003 | Damnjanovic et al. | ..... | 455/522 |

* cited by examiner

*Primary Examiner*—Tilahun Gesesse
(74) *Attorney, Agent, or Firm*—Ked & Associates, LLP

(57) ABSTRACT

A method and an apparatus for adjusting a power in a communication system are disclosed. The power control method includes selecting, in an active set, at least two base stations, estimating powers of respective reverse power control bits received from the at least two selected base stations, and transmitting, to the base stations, forward power control commands generated according to the estimated powers over power control groups, respectively.

21 Claims, 5 Drawing Sheets

METHOD AND APPARATUS FOR ADJUSTING POWER IN A COMMUNICATION SYSTEM FOR A CHANNEL USED FOR POWER CONTROL FOR REVERSE FEEDBACK CHANNELS

This application claims the benefit of the Korean Application No. P2001-67486 filed on Oct. 31, 2001, which is hereby incorporated by reference.

BACKGROUND OF THE INVENTION

1. Field of the Invention

The present invention relates to a mobile communication system, and more particularly a method and an apparatus for adjusting a power in a communication system.

2. Discussion of the Related Art

Generally, a 1x cdma2000 system is designed to support a voice service of a circuit switched mode and a medium and low-speed data service. Also, as the desire for a mobile Internet service and so on increases, a system only for a high-speed packet data communication, to the exclusion of the voice service, has been proposed, which is called a high data rate (HDR) or an 1x-evolution data only (1x-EV DO).

A combined version of the two systems is called a 1x-evolution data and voice (1x EV DV).

The 1x-EV DV system is a system that can perform the voice service and data service of the existing circuit mode simultaneously with a high-speed packet data service.

Accordingly, the 1x-EV DV system should be compatible with 1x of the existing cdma2000 system in a lower direction. Thus, all the currently considered 1x-EV DV standards support a radio configuration (RC) of the existing cdma2000 system, and have independent RC type shared channels for a packet data service in addition.

Basically, the shared channel (hereinafter, referred to as a forward packet data channel (F-PDCH)) for the packet data service can accommodate many users by using a time division multiplexing (TDM) like the HDR or using a mixed type of a code division multiplexing and the TDM.

The 1x-EV DV system uses a method of dynamically allocating an extra base station power and Walsh code to the F-PDCH in a state that voice users and data users of the existing circuit mode exist. Also, the 1x-EV DV system increases the data throughput of the base station by using a method of allocating the extra base station power and the Walsh code to a specified user having a good-quality link. At this time, for the operation of the F-PDCH is required a certain feedback channel for the respective user's transmission of the link quality between the user and the base station to the base station.

The base station performs a scheduling of the target users to whom the data is to be transmitted at the present time based on the link quality reported by the users, and selects a modulation technique and a channel coding rate suitable for the present link quality to transmits the modulation technique and the channel coding rate to the scheduled target users.

Also, in order to improve the data throughput, the F-PDCH operates a hybrid-automatic repeat request (H-ARQ) on a physical layer. For such an operation of the H-ARQ is required a reverse feedback channel for the terminal's judgment of existence/non-existence of an error in a received packet and transmission of an acknowledgement (ACK) or non-acknowledgement (NACK) bit to the base station.

The reverse feedback channel for transmitting the link quality is called a reverse channel quality indication channel (R-CQICH), and the reverse feedback channel for transmitting the ACK or NACK bit is called a reverse acknowledgement channel (R-ACKCH).

In order for the base station to properly receive the reverse feedback channels, it can be considered that a power control with respect to the reverse channels is a required process.

Basically, an IS-2000 system generates a power control bit (PCB) for a forward link power increasing or decreasing command by measuring a dedicated pilot power level of the respective terminal transmitted in a reverse direction, transmits the PCB for each power control group (PCG) by carrying the PCB on traffic information of a forward fundamental channel (F-FCH) or a forward dedicated control channel (F-DCCH), and performs the reverse power control of 800 Hz accordingly.

However, in the 1x-EV DV system, the F-FCH or F-DCCH is not always allocated to the active users (i.e., users having links set for receiving the data from a transmitting end) who will receive the packet data.

Accordingly, a certain new channel is required for the reverse power control, and the channel used for this purpose is just a forward common power control channel (F-CPCCH).

FIG. 1 is a view illustrating the construction of the conventional F-CPCCH channel.

As shown in FIG. 1, blocks for a forward common power control channel are symbol repeat blocks 102 and 109, signal point mapping blocks 103 and 110, channel gain sections 104 and 111, multiplexers 101 and 108, a relative offset calculation section 105, a decimator 106, and a long code generator 107.

The multiplexers 101 and 108 receive the power control bits (PCBs) through branches I and Q, and multiplex the PCBs by users. At this time, the multiplexers 101 and 108 adjust offset values of the PCBs by users according to the offset values provided from a relative offset calculation section 105.

The symbol repeat blocks 102 and 109 do not repeat the multiplexed PCBs through the branch I or Q in case that a transmission (Tx) diversity mode is not used, while they repeat the multiplexed PCBs only once in case that the Tx diversity mode is used.

The signal point mapping blocks 103 and 110 perform the mapping of '0' onto '+1', '1' onto '−1', and '0' in case that no transmission bit exists among the PCBs. The channel gain sections 104 and 111 adjust the channel gain to be used for the transmission in the unit of a power control group. The long code generator 107 generates a long code according to a long code mask for the power control channel, and the decimator 106 detects the long code in the unit of a chip, and provides the detected long code to the relative offset calculation section 105. Accordingly, the relative offset calculation section 105 calculates the offset values by users, and provides the offset values to the multiplexers 101 and 108.

In FIG. 1, if it is assumed that the F-CPCCH channel performs the reverse power control for 800 Hz, the power control bits (PCBs) for 24 active users are transmitted in one power control group (PCG). At this time, the PCBs for the 12 users are allocated to the branch I, and the PCBs for the remaining 12 users are allocated to the branch Q. Also, a process of randomizing positions of the PCB bits in one PCG by users through a relative offset calculation is performed. Also, if it is assumed that the F-CPCCH channel performs the reverse power control for 400 Hz and 200 Hz, the PCBs for the 48 users and the 96 users can be accommodated in one F-CPCCH channel, respectively.

The F-CPCCH channel is a common channel, and it is required that the users far apart from the base station can receive the channel with reliability. That is, the power control for the reverse feedback channels can be performed with reliability only in case that the F-CPCCH can accurately judge the PCB bits allocated to the F-CPCCH itself. The simplest usable method is a method of performing the transmission with a sufficiently high power so that the users located on the edge of the cell can receive the PCB bits with a sufficient reliability.

This method has the following problem. Since PCBs for the user located far away from the base station may be included on the F-CPCCH, the base station should allocate to the F-CPCCH a high power sufficient for the user to receive its own PCB. At this time, the forward packet data channel (F-PDCH) uses all the remaining power of the base station for the packet transmission. However, if the F-CPCCH is transmitted always with a high power, the transmission power for the F-PDCH would be lost, and this causes the reduction of the data throughput of the forward link.

Accordingly, in order to solve this problem, the forward power control should be performed in the unit of a bit with respect to the respective users who belong to one power control group.

SUMMARY OF THE INVENTION

An object of the present invention is provide to a method and an apparatus for adjusting a power in a communication system that substantially obviates one or more problems due to limitations and disadvantages of the related art.

An object of the present invention is to provide to a method and an apparatus for efficiently adjusting a power in a communication system for a channel used for power control for reverse feedback channels.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for adjusting a power in a communication system that transmits voice data and packet data includes the steps of receiving power control information of reverse channels among signals of the forward common power control channel for controlling powers of the reverse channels that transmit the feedback information for the packet data of a forward link, and controlling and transmitting the respective powers of the reverse channels according to the power control information.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

The present invention proposes an efficient forward power control method for an F CPCCH used for the power control for a reverse feedback channels (i.e., channels for transmitting condition information of a forward link) of the 1X-EV DV system. Herein, the forward direction is a signal transmission direction from the base station to the terminal, and the reverse direction is a signal transmission direction from the terminal to the base station. However, the forward direction or reverse direction is not limited to the base station or the terminal, but can be used in signal transmission between other devices.

Among terms used in the present invention, a forward power control bit (F-PCB) is defined as a command transmitted from the terminal to the base station through the reverse link channel for the forward power control. Also, a reverse power control bit (R-PCB) is defined as a command transmitted from the base station to the terminal through the forward link channel for the reverse power control.

Figure 1:
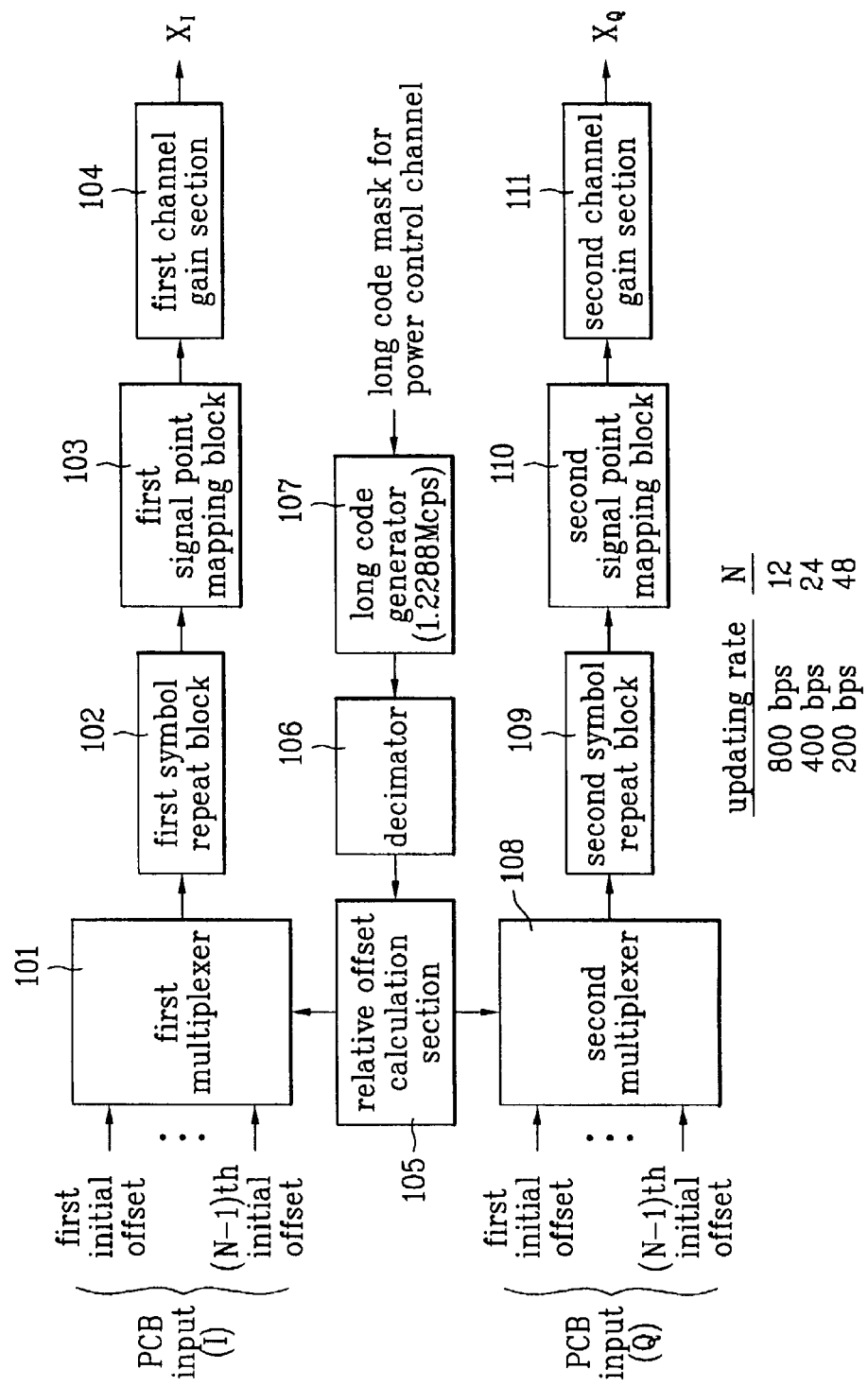
FIG. 1 is a diagram illustrating the transmission chain of a conventional F-CPCCH.
Figure 2:
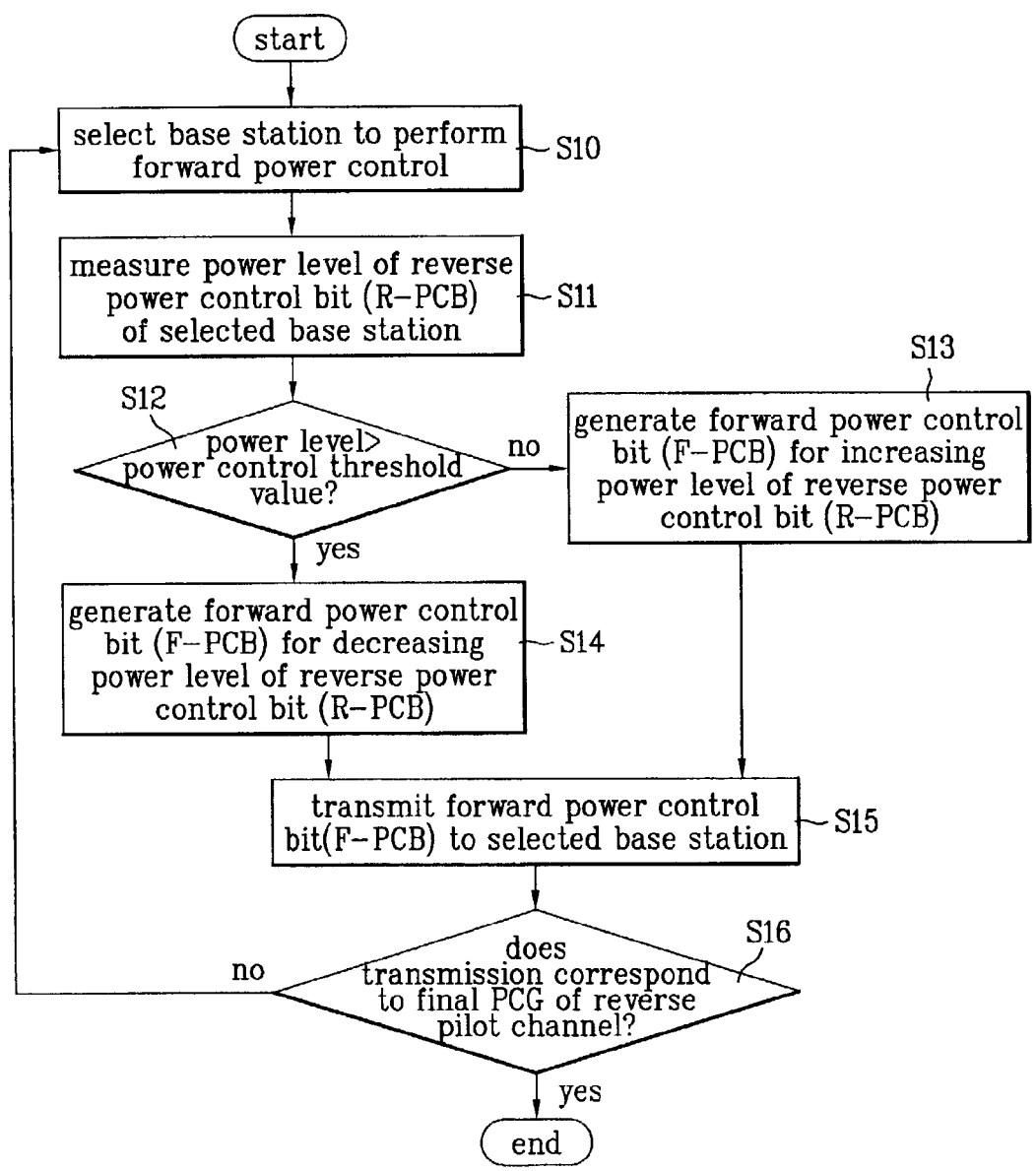
FIG. 2 is a flowchart illustrating a forward PCB generating process according to the present invention.

FIG. 2 is a flowchart illustrating the forward PCB generating process in the terminal according to the present invention.

Referring to FIG. 2, the terminal first selects at least one base station that will perform the forward power control (step S10). If it is defined that the size of an active set managed by the terminal is n, the number of base stations is j, and the number of the PCGs is i (i=0, 1, 2, 3, . . . 15), the at least one base station is selected by an equation 'j=i mod n'. If it is assumed that the size of the active set managed by the terminal is 3, a $0^{th}$ base station is selected in a $0^{th}$ PCG, a first base station in a first PCG, a second base station in a second PCG, and then a $0^{th}$ base station in a third PCG. At this time, the number of the PCGs starts from 0 and increases up to 15 in the unit of a frame. That is, after the last $15^{th}$ PDG in the frame, the first PCG of a new frame starts from the $0^{th}$ PCG.

The process of selecting the base station as described above is performed so that all the base stations in the active set are selected in order by PCGs. This selection process (step S10) is performed if it is assumed that the corresponding terminal exists in the active set region that includes at least one base station. If n is 1, i.e., if the terminal isn't located in a service area of a soft-handoff, only one base station is continuously selected through the above-described selecting process. The terminal measures the power level of the PCB transmitted from the selected base station (step S11), and then compares the measured power level with a power control threshold value for the PCB owned by the terminal itself (step S12). If the measured power level is greater than the power control threshold value, the terminal generates a forward PCB (F-PCB) indicative of decreasing the power level of the R-PCB (step S14), while if the power level is not greater than the threshold value, it generates an F-PCB indicative of increasing the power level of the R-PCB (step S13).

Figure 3:
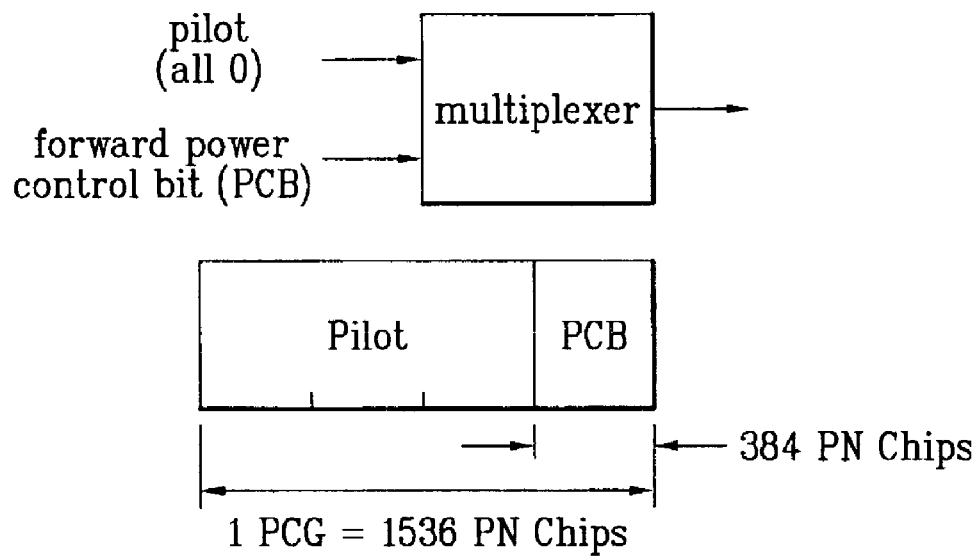
FIG. 3 is a view illustrating a multiplexing relationship between a power control group sub-channel and a pilot channel during a transmission period of an i-th PCG.

The terminal transmits the generated F-PCB to the selected base station through a PCB sub-channel of a reverse pilot channel (step S15). As shown in FIG. 3, the PCB sub-channel accounts for the last a ¼ transmission period of one PCG of the reverse pilot channel. That is, if the number of chips filled in one PCG is 1536, the last 384 chips correspond to the one-bit F-PCB to be transmitted.

Also, the power level of the reverse pilot channel for transmitting the generated F-PCB is determined by the R-PCB bit included in the power control group (PCG) allocated to the terminal itself on the F-CPCCH transmitted from the base station.

FIG. 3 is a view illustrating the multiplexing relationship between the power control group sub-channel and the pilot channel during a transmission period of the i-th PCG of the reverse pilot channel.

The steps S10 to S15 are repeated for the next PCGs. The respective users who are allocated with the F-CPCCH perform the process of FIG. 2 to perform the forward power control process for the F-CPCCH.

Figure 4:
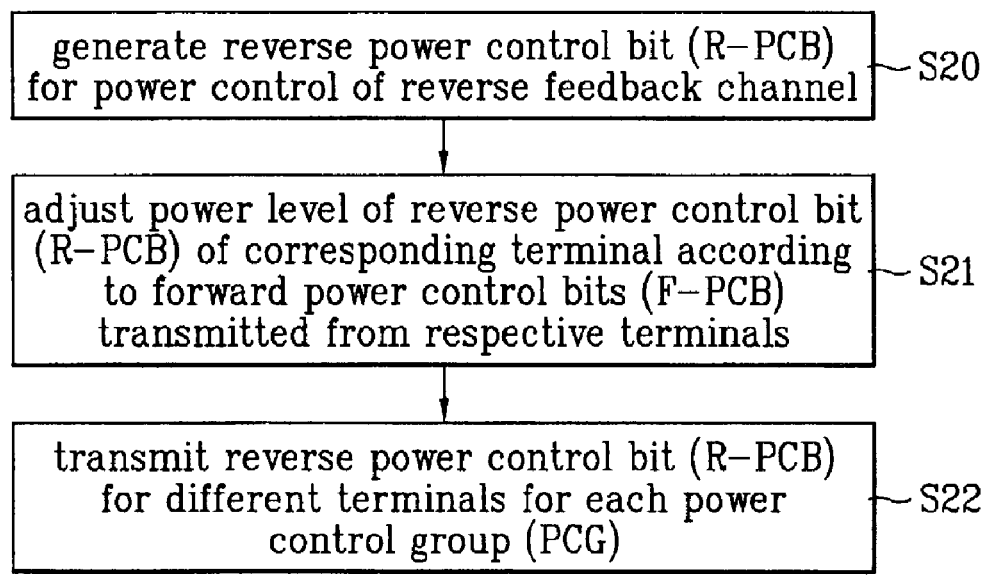
FIG. 4 is a flowchart illustrating a reverse PCB generating process according to the present invention.
Figure 5:
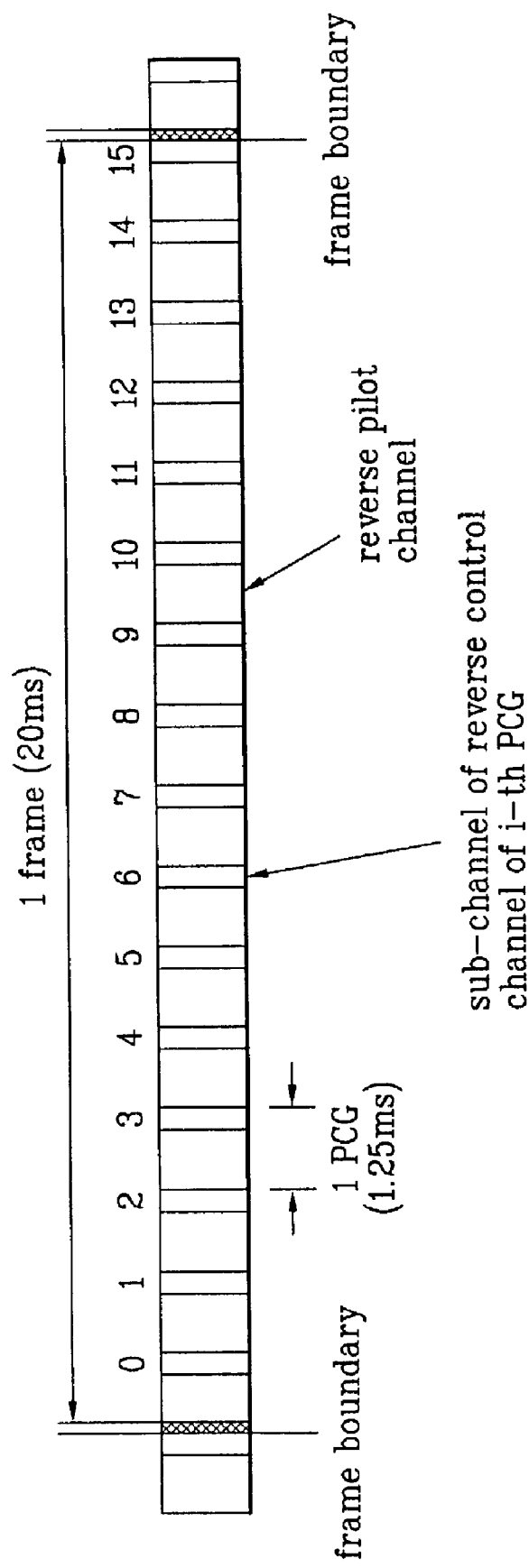
FIG. 5 is a view illustrating a multiplexing relationship between a reverse pilot channel and a power control group sub-channel according to the present invention.

FIG. 4 is a flowchart illustrating the reverse PCB generating process of the base station according to the present invention.

Referring to FIG. 4, the base station generates the R-PCB for the power control of the reverse feedback channel or the reverse pilot channel (step S20). The base station generates the R-PCB in a manner that it measures the signal-to-interference ratio (SIR) of the reverse pilot channel transmitted from the terminal to the base station, compares the measured SIR with the power control threshold value managed by the base station, and then generates the R-PCB indicative of decreasing a power level of the reverse feedback channel or the reverse pilot channel in case that the measured value is greater than the threshold value, while it generates the R-PCB indicative of increasing a power level of the reverse feedback channel or the reverse pilot channel in case that the measured value is not greater than the threshold value.

As described above, the reverse feedback channel is a channel through which the forward link quality information (condition information) or the receipt information (ACK or NACK) of the previous data is transmitted, and the corresponding base station schedules the terminals, determines a modulation technique, and a channel coding rate using the feedback information for each of the terminals, and transmits them to a corresponding terminal.

If it is judged that the F-PCB transmitted from the terminal through the process of FIG. 2 indicates the power level-increasing command, the base station increases the transmission power level of the R-PCB allocated to the terminal by $\Delta_{up}$ dB, while if the F-PCB indicates the power level-decreasing command, the base station decreases the transmission power level of the R-PCB by $\Delta_{down}$ dB (step S21). The R-PCBs whose power levels are adjusted for the respective terminals are transmitted through the PCB sub-channels in the respective PCGs (step S22).

At this time, according to the present invention, in performing the reverse power control using the F-CPCCH and the forward power control for the respective power control bits in the F-CPCCH, the transmission of the R-PCB and the F-PCB is performed as follows considering the soft handoff.

For instance, a 2-way soft-handoff where two base stations A and B exist in the active set is considered. At this time, the communication quality of the reverse link channel transmitted to the base station A and the communication quality of the reverse channel transmitted to the base station B may be different from each other, and thus the R-PCBs that the base station A and the base station B will transmit to the terminal using their own F-CPCCHs may be also different from each other. Accordingly, the terminal cannot perform a coherent combining of the R-PCBs transmitted from the base station A and the R-PCB transmitted from the base station B. Consequently, it becomes impossible for the terminal to make one common F-PCB for adjusting the transmission power level of the R-PCBs from the base station A and the transmission power level of the R-PCB from the base station B. To solve this problem, the present invention can be used. For example, it is assumed that a terminal is located in a service area of a soft-handoff including the two base stations A and B, and the terminal alternately performs the forward power control for the base station A and the forward power control for the base station B by power control group (PCG). One frame is composed of 16 PCGs, which are numbered from $0^{th}$ to $15^{th}$ PCGs.

First, the F-PCB transmitted through the PCB sub-channel of the reverse pilot channel during a transmission period of the $0^{th}$ PCG is used only for the power control of the R-PCB of the F-CPCCH to be transmitted from the base station A to the terminal. Thus, in order to generate the F-PCB to be transmitted through the PCB sub-channel during a transmission period of the $0^{th}$ PCG, the terminal measures the power of the R-PCB of the F-CPCCH transmitted from the base station A to itself. The base station A performs the power control of the R-PCB of the F-CPCCH for a corresponding terminal using the F-PCB transmitted during a transmission period of the $0^{th}$ PCG.

The base station B discards the F-PCB transmitted during a transmission period of the $0^{th}$ PCG, and maintains the transmission power used during a transmission period of the previous PCG. Next, the F-PCB transmitted through the PCB sub-channel of the reverse pilot channel during a transmission period of the $1^{st}$ PCG is used only for the power control of the R-PCB of the F-CPCCH to be transmitted from the base station B to the terminal. Thus, in order to generate the F-PCB to be transmitted through the PCB sub-channel during a transmission period of the $1^{st}$ PCG, the terminal measures the power of the R-PCB of the F-CPCCH transmitted from the base station B to itself. The base station B performs the power control of the R-PCB of the F-CPCCH CPCCH for a corresponding terminal using the F-PCB transmitted during a transmission period of the $1^{st}$ PCG. The base station A discards the F-PCB transmitted during a transmission period of the $1^{st}$ PCG, and maintains the transmission power used during a transmission period of the previous PCG.

Through the above-described operation, the forward power control for the F-CPCCH of the respective base stations will have an effective power control rate of 400 Hz.

The above-described process is applied in the same manner if two or more base stations exist in the active set. If the number of base stations existing in the active set managed by the terminal is indicated as n and the numbers of the base stations existing in the active set are defined 0 to n−1, the terminal generates the F-PCBs to be transmitted to the corresponding base station by measuring power levels of the R-PCBs transmitted from the respective base stations. Herein, the PCGs for which F-PCBs are respectively transmitted are allocated to all the base stations. Through this process, the effective power control rate will be about 800/n Hz. If it is assumed that the number of base stations that can be managed by the terminal in the active set is set to 6 at maximum and 6 base stations are located in a service area of the soft handoff, the effective power control rate of the forward power control for the F-CPCCH of the respective base stations becomes about 800/6 Hz.

If the terminal does not exist in the service area of the soft-handoff, the number n of base stations in the active set will be '1', and the effective power control rate for the base stations will be 800 Hz.

Figure 6:
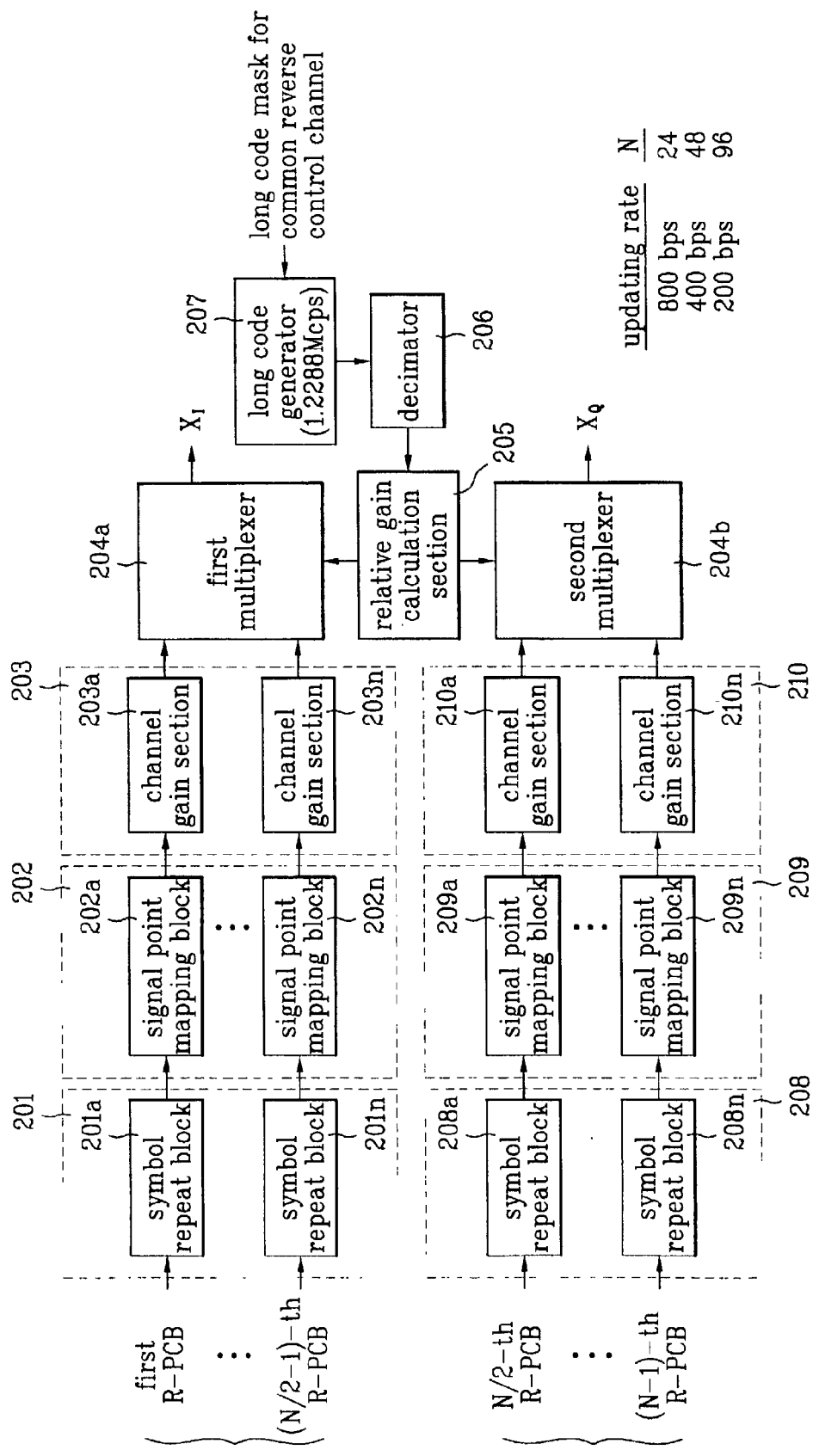
FIG. 6 is a diagram illustrating the transmission chain of an F-CPCCH for enabling a power control by users according to the present invention.

In order to perform the power control in the unit of a bit for the R-PCBs for the respective terminals having F-CPCCH through the above process, the F-CPCCH having the transmission chain of FIG. 6 should be used.

FIG. 6 is a view illustrating the transmission chain of an F-CPCCH for enabling a power control by terminals according to the present invention.

As shown in FIG. 6, the transmission chain for generating the forward common power control channel for the reverse power control channel includes symbol repeat blocks 201 and 208, signal point mapping blocks 202 and 209, channel gain sections 203 and 210, multiplexers 204a and 204b, a relative offset calculation section 205, a decimator 206, and a long code generator 207, for each of the I and Q channels.

In the I and Q channels, the R-PCBs for the respective terminals, which were generated as shown in FIG. 3, are inputted to the respective symbol repeat blocks 201 and 208. The symbol repeating blocks 201 and 208 perform the symbol repetition of the inputted R-PCBs (for this, the modulation symbol rate is 9.6 kbps) with repetition factor 1 in case that the transmission (Tx) diversity mode is not used, and perform the symbol repetition of the inputted R-PCBs with repetition factor 2 (for this, the modulation symbol rate is 19.2 kbps) in case that the Tx diversity mode is used.

The signal point mapping blocks 202 and 209 for the respective I and Q channels perform the mapping of '0' onto '+1', '1' onto '−1', and '0' in case of no transmission bit among the repeated R-PCBs.

The channel gain sections 203 and 210 for the respective I and Q channels adjust the channel gains of the R-PCBs to be used for the transmission in the unit of a bit. That is, the base station performs the power control in the unit of a bit by adjusting the channel gain of the corresponding R-PCB, i.e., the power of the terminal that transmitted the F-PCB with reference to the F-PCB generated and transmitted as shown in FIG. 2.

The multiplexers 204a and 204b perform the multiplexing of the R-PCBs whose gains are adjusted. At this time, the multiplexers 204a and 204b adjust the initial offset values of the R-PCBs according to the offset values provided from the relative offset calculation section 205.

The long code generator 207 generates a long code according to a long code mask for the reverse common power control channel, and the decimator 206 detects the generated long code in the unit of a chip, and provides the detected long code to the relative offset calculation section 205. Accordingly, the relative offset calculation section 205 calculates the initial offset values of the respective terminals, and provides the initial offset values to the multiplexers 204a and 204b.

The output data rate of the multiplexers 204a and 204b of the respective channels will be 9.6 kbps.

As described above, according to the present invention, an effective power control method can be applied to the forward common power control channel (F-CPCCH) that is used for the power control of the reverse feedback channel in the 1x-EV DV system. Accordingly, the transmission power level of the forward common power control channel can be maintained in a proper level, and thus it becomes possible to increase the system data throughput of the forward packet data channel.

It will be apparent to those skilled in the art than various modifications and variations can be made in the present invention. Thus, it is intended that the present invention covers the modifications and variations of this invention provided they come within the scope of the appended claims and their equivalents.

What is claimed is:

1. A method for adjusting a power in a communication system, the method comprising:
   receiving at a base station power control commands from at least two mobile stations through a reverse pilot channel; and
   transmitting, to each of the mobile stations, power control information for a reverse quality feedback channel through a forward common control channel by the base station.

2. The method of claim 1, wherein powers of power control groups of the forward common control channel are respectively adjusted according to the power control commands.

3. The method of claim 2, wherein powers of power control groups of the forward common control channel are respectively adjusted according to the power control commands received on predetermined power control groups.

4. The method of claim 3, wherein powers of power control groups remained except for the predetermined power control groups are maintained based on previously corresponding powers.

5. A method for adjusting a power in a communication device, the method comprising:
   selecting by a mobile terminal, in an active set, at least two base stations;
   estimating, by the mobile terminal, powers of respective reverse power control bits received from the at least two selected base stations; and
   transmitting, from the mobile terminal to the base stations, forward power control commands generated according to the estimated powers over power control groups, respectively.

6. The method of claim 5, wherein the forward power control commands are transmitted on corresponding power control groups to be allocated to the base stations.

7. The method of claim 5, the generating further comprising;
   comparing the estimated power values to a threshold value;
   generating a forward power-increasing command for each base station if each estimated power value is greater than the threshold value; and generating a forward power-decreasing command for each base station if each estimated power value is less than the threshold value.

8. The method of claim 5, wherein the communication system is used for voice data and packet data.

9. The method of claim 5, wherein the forward power control bits is used for adjusting a power of the forward common control channel.

10. The method of claim 9, wherein the forward common control channel is used for adjusting a power of a reverse feedback channel through which a receiving quality of packet data is transmitted.

11. An apparatus for adjusting a power in a communication system, the apparatus comprising:
a receiver for receiving power control commands from at least two mobile stations through a reverse pilot channel; and
a transmitter for transmitting, to each of the mobile stations, power control information for a reverse quality feedback channel through a forward common control channel.

12. The apparatus of claim 11, wherein powers of power control groups of the forward common control channel are respectively adjusted according to the power control commands.

13. The apparatus of claim 12, wherein powers of power control groups of the forward common control channel are respectively adjusted according to the power control commands received on predetermined power control groups.

14. The apparatus of claim 13, wherein powers of power control groups remained except for the predetermined power control groups are maintained based on previously corresponding powers.

15. An apparatus for adjusting a power in a communication device, the apparatus comprising:
a selector for selecting, in an active set, at least two base stations;
a estimator for estimating powers of respective reverse power control bits received from the at least two selected base stations; and
a transmitter for transmitting forward power control commands generated according to the estimated powers to the base stations over power control groups, respectively.

16. The apparatus of claim 15, wherein the forward power control commands are transmitted on corresponding power control groups to be allocated to the base stations.

17. The apparatus of claim 15, further comprising:
a comparator for comparing the estimated power values to a threshold value,
a generator for generating a forward power-increasing command for each base station if each estimated power is greater than the threshold value and a forward power-decreasing command for each base station if each estimated power is less than the threshold value.

18. A method for adjusting a power in a communication system, the method comprising:
selecting at least two receiving ends in a soft handoff service area;
estimating power levels of at least two reverse power control bits received from the selected receiving ends;
generating at least two forward power control bits according to the estimated power levels for adjusting the power levels of the at least two reverse power control bits; and
transmitting the at least two forward power control bits to corresponding receiving ends through a reverse pilot channel;
adjusting the power levels of the reverse power control bits based on the forward power control bits at each of the receiving ends.

19. The method of claim 18, further comprising respectively multiplexing the at least two forward power control bits and reference pilot bits.

20. The method of claim 18, wherein the multiplexed bits are included within power control groups allocated to the receiving ends, respectively.

21. The method of claim 18, further comprising adjusting a power level of a feedback channel based on the reverse power control bits whose power levels are adjusted based on the forward power control bits.

* * * * *